US011790353B2

(12) United States Patent
Kim

(10) Patent No.: US 11,790,353 B2
(45) Date of Patent: Oct. 17, 2023

(54) SYSTEM AND METHOD FOR ONLINE/OFFLINE PAYMENT WITH VIRTUAL CURRENCY FOR NODES INCLUDED IN MOBILE-BASED BLOCKCHAIN DISTRIBUTED NETWORK

(71) Applicant: Song Hwan Kim, Seoul (KR)

(72) Inventor: Song Hwan Kim, Seoul (KR)

( * ) Notice: Subject to any disclaimer, the term of this patent is extended or adjusted under 35 U.S.C. 154(b) by 0 days.

(21) Appl. No.: 17/760,654

(22) PCT Filed: Jan. 5, 2022

(86) PCT No.: PCT/KR2022/000113
§ 371 (c)(1),
(2) Date: Mar. 15, 2022

(87) PCT Pub. No.: WO2022/265176
PCT Pub. Date: Dec. 22, 2022

(65) Prior Publication Data
US 2022/0405738 A1    Dec. 22, 2022

(30) Foreign Application Priority Data

Jun. 16, 2021  (KR) .......................... 10-2021-0077739

(51) Int. Cl.
*G06Q 20/36* (2012.01)
*G06Q 40/04* (2012.01)
(52) U.S. Cl.
CPC ......... *G06Q 20/3678* (2013.01); *G06Q 40/04* (2013.01)
(58) Field of Classification Search
None
See application file for complete search history.

(56) References Cited

U.S. PATENT DOCUMENTS 10,055,715 B1 *  8/2018  Grassadonia .......... G06Q 20/06
10,621,561 B1 *  4/2020  Brock ................... G06Q 20/381
(Continued)

FOREIGN PATENT DOCUMENTS

KR        10-1994455 B1    6/2019
KR     10-2020-0017150 A   2/2020
(Continued)

OTHER PUBLICATIONS

Korean Office Action for related KR Application No. 10-2021-0077739 dated Oct. 5, 2021 from Korean Intellectual Property Office.
(Continued)

*Primary Examiner* — Neha Patel
*Assistant Examiner* — Jahed Ali
(74) *Attorney, Agent, or Firm* — Paratus Law Group, PLLC

(57) ABSTRACT

An open electronic commerce system includes a user computing device holding a virtual currency, as a node of a blockchain network; a virtual currency exchange server configured to support virtual currency trading; a point exchange service server configured to determine a reference price parameter from the virtual currency exchange server when there is a request for exchange of the virtual currency that the user computing device holds, and to exchange the virtual currency for a point corresponding to the virtual currency requested to be exchanged; and an electronic commerce server configured to provide support for purchase of an item with the point.

13 Claims, 5 Drawing Sheets

(56) References Cited

U.S. PATENT DOCUMENTS

| | | | | |
|---|---|---|---|---|
| 10,839,378 | B1* | 11/2020 | Srinivasan | G06Q 20/401 |
| 10,924,568 | B1* | 2/2021 | Karakas | H04L 51/214 |
| 11,526,610 | B2* | 12/2022 | Bacher | G06F 16/1834 |
| 2006/0235795 | A1* | 10/2006 | Johnson | G06Q 20/02 705/26.1 |
| 2006/0235796 | A1* | 10/2006 | Johnson | G06Q 20/4014 705/26.1 |
| 2009/0125402 | A1* | 5/2009 | Voltmer | G06Q 30/0235 705/26.1 |
| 2012/0016730 | A1* | 1/2012 | Antonucci | G06Q 30/0283 705/14.28 |
| 2013/0016955 | A1* | 1/2013 | Pejaver | H04N 21/242 386/E9.011 |
| 2013/0024364 | A1* | 1/2013 | Shrivastava | G06Q 20/12 705/39 |
| 2013/0024371 | A1* | 1/2013 | Hariramani | G06Q 20/384 705/41 |
| 2014/0337175 | A1* | 11/2014 | Katzin | G06Q 20/326 705/26.62 |
| 2015/0265929 | A1* | 9/2015 | Mooney | A63F 13/792 463/25 |
| 2017/0161733 | A1* | 6/2017 | Koletsky | G06Q 20/382 |
| 2017/0249606 | A1* | 8/2017 | Pirooz | G06Q 40/02 |
| 2017/0286990 | A1* | 10/2017 | Kikuchi | G06Q 30/0232 |
| 2018/0109541 | A1* | 4/2018 | Gleichauf | H04W 8/24 |
| 2018/0293576 | A1* | 10/2018 | Song | G06Q 20/223 |
| 2019/0244237 | A1* | 8/2019 | Magnuson, Jr. | G06Q 30/0227 |
| 2019/0295049 | A1* | 9/2019 | Karame | G06Q 20/0658 |
| 2019/0325473 | A1* | 10/2019 | Swamidurai | H04L 9/50 |
| 2019/0385215 | A1* | 12/2019 | Ferenczi | G06Q 20/12 |
| 2020/0044824 | A1* | 2/2020 | Xie | H04L 9/0637 |
| 2020/0051115 | A1* | 2/2020 | Lawrence | H04L 63/08 |
| 2020/0192886 | A1* | 6/2020 | Mishra | H04L 9/50 |
| 2020/0286048 | A1* | 9/2020 | Xu | G06Q 20/065 |
| 2020/0372154 | A1* | 11/2020 | Bacher | H04L 41/145 |
| 2020/0372792 | A1* | 11/2020 | Li | G06V 10/764 |
| 2021/0083852 | A1* | 3/2021 | Destefanis | H04L 67/1091 |
| 2021/0103921 | A1* | 4/2021 | Gadwale | H04L 63/12 |
| 2021/0248636 | A1* | 8/2021 | Park | G06Q 30/0215 |
| 2022/0148085 | A1* | 5/2022 | Park | G06Q 40/02 |
| 2022/0245623 | A1* | 8/2022 | Filter | G06K 7/1095 |

FOREIGN PATENT DOCUMENTS

| | | |
|---|---|---|
| KR | 10-2143639 B1 | 8/2020 |
| KR | 2022089812 A * | 6/2022 |
| WO | WO-2019123416 A1 * | 6/2019 |

OTHER PUBLICATIONS

Internet catalog, "Label Incubating", Feb. 24, 2021, pp. 1-4, https://cobak.co.kr/community/106/post/578591.

Park Ji-Hoon, "Sound source, masterpiece painting, Gangnam building, limited edition sneakers . . . Piece investment in ssamzit money, why not stocks?", May 27, 2021, pp. 1-6, https://www.mk.co.kr/news/economy/view/2021/05/512252.

Korean Decision to Grant a Patent for related KR Application No. 10-2021-0077739 dated Dec. 8, 2021 from Korean Intellectual Property Office.

* cited by examiner

SYSTEM AND METHOD FOR ONLINE/OFFLINE PAYMENT WITH VIRTUAL CURRENCY FOR NODES INCLUDED IN MOBILE-BASED BLOCKCHAIN DISTRIBUTED NETWORK

CROSS-REFERENCE TO PRIOR APPLICATIONS

This application is a National Stage Patent Application of PCT International Patent Application No. PCT/KR2022/000113 (filed on Jan. 5, 2022) under 35 U.S.C. § 371, which claims priority to Korean Patent Application No. 10-2021-0077739 (filed on Jun. 16, 2021), which are all hereby incorporated by reference in their entirety.

BACKGROUND

The present disclosure relates to a mobile-based blockchain payment system and method and, more particularly, to a platform for purchasing an item and investing with virtual currency.

A blockchain is a core technology of the fourth industrial revolution, and is of interest to various fields, such as finance, distribution, and public service. The dictionary definition of the blockchain is "a distributed data storage technology that records a trade record transparently in a digital ledger that anyone can read, and stores copies of the record in multiple computers".

At the initial stage, the blockchain as developed as a base technology for establishing Bitcoin that is cryptocurrency or virtual currency. In the past, an intermediate agent, such as a bank, was absolutely necessary for trade, but it is possible to conduct trade between the parties without an intermediate agent by using the blockchain technology.

Bitcoin is the first generation cryptocurrency, and the second generation cryptocurrency is Ethereum. Ethereum was first proposed in an Ethereum white paper by Vitalik Buterin, a Russian-Canadian programmer, in 2013, and Ethereum service was started in 2015. Unlike the existing blockchain, Ethereum is a blockchain platform incorporating a smart contract and has attracted attention to date by expanding the scalability of the technology.

The core of the blockchain platform that Ethereum provides is a smart contract and a decentralized application (dApp) technology. A smart contract is a concept that existed before the advent of Bitcoin, and was first published as a thesis by Nick Szabo in 1997.

According to the thesis, the smart contract as introduced as follows: "a smart contract uses a protocol and a user interface to facilitate all steps of the contract process. This provides a new way to use digital contracts that are much more functional than the existing written contract methods". This idea was combined with the blockchain technology and realized in the form of an automatic contract program that runs within the Ethereum blockchain. A contract that was drawn up in writing is realized as code, and contract is automatically executed when particular conditions for executing the code are satisfied.

Even if the two parties to the contract do not trust each other, when the necessary conditions are satisfied, the contract can be concluded. Therefore, the contract can be executed without the intervention of the third party (intermediator). In addition, transactions are verified and updated by all nodes constituting the blockchain, and can prevent contract denial or fraud, on behalf of trade intermediation and guarantee roles. Based on such a smart contract, the decentralized application (dApp) is an application that distributes information over a network without a central server and stores and runs the information. The dApp may enhance availability, compared to a conventional application based on a centralized server.

The blockchain technology for Bitcoin stores data securely and secures integrity, enabling trade intermediation and guarantee functions of financial institutions, such as banks, to be replaced with a distributed ledger. The dApp based on the Ethereum blockchain has proposed an innovative model that enables trades conducted in various fields, such as finance, insurance, transportation, distribution, music, IoT, and education, to be available in all data processing as smart contracts.

According to the scalability of the smart contract-based Ethereum blockchain supporting various application service developments, there have been active attempts to introduce a blockchain to conventional services that have relied on centralized intermediation institutions.

However, unlike the above-described theoretical method, the actual circulation of virtual currency remains very limited as it is used in trade between individuals without national approval.

In addition, there are various virtual currencies recently, but there is no compatibility therebetween. This is because in individual-to-individual trade with virtual currency, the types of virtual currencies that a buyer and a seller hold may be different.

In particular, it is impossible to evaluate the values of the various virtual currencies.

Therefore, in the current market, there is a demand for a scheme for encouraging purchase of an item and a service, an auction, investment, etc. using virtual currency.

In addition, there is a demand for a scheme for enabling compatibility between various types of virtual currencies.

SUMMARY

Considering such market needs, the present disclosure is directed to providing a system and a method enabling blockchain-based virtual currency to be used for various types of electronic commerce, such as purchase of an item, a service, an auction, purchase of cultural assets, investment, and cloud funding.

In addition, the present disclosure is directed to providing an electronic commerce system and method that determine relative values of various virtual currencies, and enable compatibility.

According to one aspect of the present disclosure, there is provided a blockchain payment system including: a user computing device holding a virtual currency, as a node of a blockchain network; a virtual currency exchange server configured to support virtual currency trading; a point exchange service server configured to determine a reference price parameter from the virtual currency exchange server when there is a request for exchange of the virtual currency that the user computing device holds, and to exchange the virtual currency for a point corresponding to the virtual currency requested to be exchanged; and an electronic commerce server configured to provide support for purchase of an item with the point.

In an embodiment of the present disclosure, a plurality of the user computing devices may be full nodes or light nodes of the blockchain network, and may be configured to mine the virtual currency in a group or individually, and one of the full nodes in the group formed by grouping may operate as a gateway.

In an embodiment of the present disclosure, the point exchange service server may include: a mining matching module configured to determine whether the virtual currency to be exchanged is held, according to the request of the user computing device for exchange; and a point conversion module configured to exchange the virtual currency for the point according to the reference price parameter when the mining matching module determines that the virtual currency to be exchanged is held.

In an embodiment of the present disclosure, the point exchange service server may further include the electronic commerce server for the user computing device of which the virtual currency is exchanged for the point.

In an embodiment of the present disclosure, the mining matching module may be configured to determine whether the user computing device that has requested exchange for the point has authority to distribute the virtual currency mined by the gateway in the group, and when the user computing device has the authority to distribute, a part of the mined virtual currency may be added through a smart contract to the virtual currency that the user computing device holds.

In an embodiment of the present disclosure, the item may be at least one item selected from a group of a physical item, a service item, an auction, funding, employment, and cultural content.

In an embodiment of the present disclosure, the electronic commerce server may be configured to receive a funding idea, provide the funding idea to the gateways in a plurality of the groups, determine whether agreement is reached, and provide the funding idea to all the user computing devices when the agreement reaches a reference value or above, so that the user computing devices are allowed to participate optionally in the funding with the points.

In addition, according to another aspect of the present disclosure, there is provided a blockchain payment method including: a) determining, by a point exchange service server, a virtual currency that a user computing device holds when the user computing device makes a request for exchange of the virtual currency that the user computing device holds; b) exchanging, by using a reference price parameter by the point exchange service server, the virtual currency for a point corresponding to an amount of the virtual currency requested to be exchanged when the amount of the virtual currency requested to be exchanged is equal to or smaller than an amount of the virtual currency that the user computing device holds, as a result of determination at the step a); and c) purchasing an item provided by an electronic commerce server, by using the point.

In an embodiment of the present disclosure, at the step a), the user computing device may be a full node or a light node of a blockchain network, and may belong to a group including a gateway that is a full node.

In an embodiment of the present disclosure, the item may be at least one item selected from a group of a physical item, a service item, an auction, funding, employment, and cultural content.

In an embodiment of the present disclosure, at the step a), when the user computing device that has requested exchange for the point is the light node in the group, it is determined whether the user computing device has authority to distribute the virtual currency mined by the gateway, and when the user computing device has the authority to distribute, a distribution amount of the mined virtual currency is added to the amount of the virtual currency that the user computing device holds, and it is determined whether the amount of the virtual currency resulting from addition is equal to or greater than the amount of the virtual currency requested to be exchanged for the point.

In an embodiment of the present disclosure, the addition to the amount of the virtual currency may be performed through a smart contract.

In an embodiment of the present disclosure, when the item is the funding, the electronic commerce server may be configured to receive a funding idea, provide the funding idea to gateways in a plurality of groups, determine whether agreement is reached, and provide the funding idea to all of a plurality of the user computing devices when the agreement reaches a reference value or above, so that the user computing devices are allowed to participate optionally in the funding with the points.

In an embodiment of the present disclosure, the funding may be funding for cultural content items including at least one selected from a group of a physical item idea, a service item, a movie, music, a novel, a poem, and a video.

In an embodiment of the present disclosure, the user computing device may be a smartphone in which installed may be a blockchain-only application or a platform application distributed through an application store and including call, message, chat, shopping, payment, and virtual currency functions.

According to the present disclosure, the virtual currency held in an electronic wallet of the user computing device can be converted into a point of a particular value, and electronic commerce is performed using the point, thereby allowing virtual currency to be used as a general-purpose payment means.

In addition, according to the present disclosure, the type of virtual currency held in the electronic wallet of the user computing device is determined, and a relative value according to the type of virtual currency is evaluated for compatibility, thereby obtaining compatibility between various virtual currencies.

DETAILED DESCRIPTION

Figure 1:
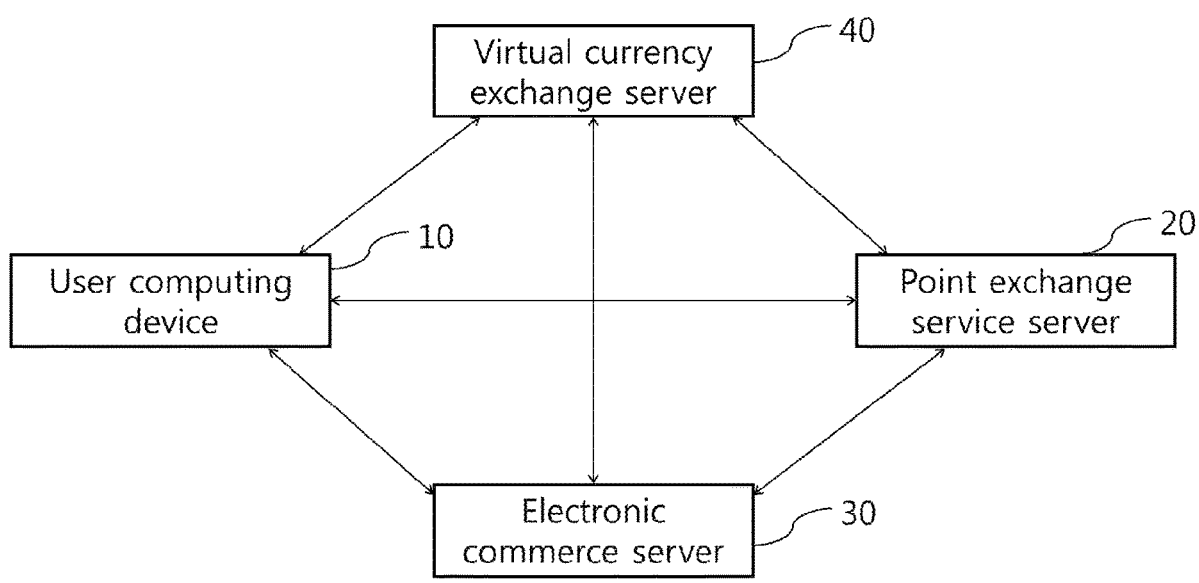
FIG. 1 is a block diagram illustrating a blockchain payment system according to the present disclosure.

For full understanding of the configuration and effects of the present disclosure, exemplary embodiments of the present disclosure will be described with reference to the accompanying drawings. However, the present disclosure is not limited such embodiments and may be realized in different forms, and various modifications may be made. Rather, the description of the embodiments is provided so that the present disclosure will be thorough and complete, and will fully convey the scope of the disclosure to those skilled in the art to which the present disclosure pertains. In the drawings, some elements are enlarged in size than actual ones for convenience of description, and the proportion of each element may be exaggerated or reduced.

Terms, "first", "second", etc., may be used to described various elements, but the elements are not to be construed as being limited to the terms. The terms are only used to differentiate one element from other elements. For example, without departing from the scope of the present disclosure, a first element may be named a second element, and similarly, a second element may be named a first element. In addition, the singular forms "a", "an", and "the" are intended to include the plural forms as well, unless the context clearly indicates otherwise. Unless otherwise defined, all terms used herein have the same meaning as commonly understood by those skilled in the art.

Hereinafter, an open electronic commerce system and method using virtual currency according to an embodiment of the present disclosure will be described in detail with reference to the drawings.

FIG. 1 is a block diagram illustrating a mobile-based blockchain payment system according to an exemplary embodiment of the present disclosure.

Referring to FIG. 1, according to the present disclosure, included are a user computing device 10, a point exchange service server 20, an electronic commerce server 30, and a virtual currency exchange server 40. The user computing device 10 holds an electronic wallet on a blockchain network. The point exchange service server 20 exchanges, for a contracted point, all or part of the virtual currency in the electronic wallet of the user computing device 10 according to a request of the user computing device 10. The electronic commerce server 30 provides a service for purchasing an item with a point of the point exchange service server 20 or the user computing device 10. The virtual currency exchange server 40 provides value information of various virtual currencies to the exchange service server 20 and enables virtual currency investment with points.

Hereinafter, the configuration and operation of an open electronic commerce system using virtual currency according to the present disclosure configured as described above will be described in more detail.

First, the user computing device 10 is a device that mines virtual currency or holds an electronic wallet for virtual currency on the blockchain network.

The user computing device 10 is a node of the blockchain network and may be a full node or a light node. In the case of a light node, as known, a ledger is not held, and individual trade needs to be verified by making a request to a full node for trade data.

The user computing device 10 may be a PC, such as a computer or a laptop computer, or a mobile device, such as a table PC or a smartphone, or may be a wearable device, such as a smart watch.

In addition, the user computing device 10 may be an edge device of a comprehensive concept, connected to an edge node on a cloud network.

Figure 2:
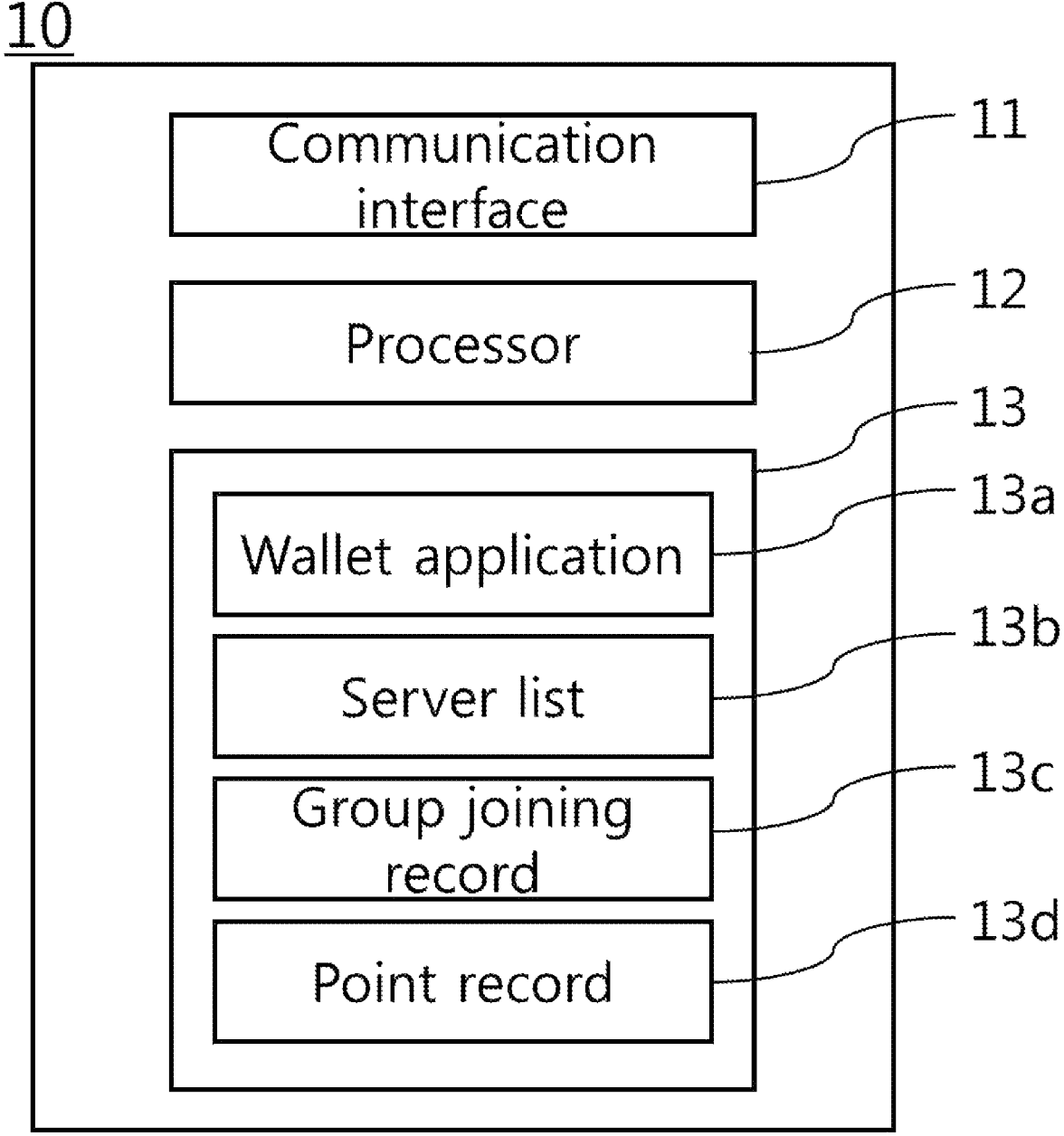
FIGS. 2 and 3 are block diagrams each illustrating an example of a user computing device.

FIG. 2 is a block diagram illustrating an example of a user computing device 10.

Referring to FIG. 2, the user computing device 10 may include a communication interface 11, a processor 12, and a memory 13.

The user computing device 10 may perform communication with nodes included in a distributed network system and a server through the communication interface 11. In particular, the user computing device 10 may perform communication with the point exchange service server 20, the electronic commerce server 30, and the virtual currency exchange server 40 mentioned above.

In the memory 13, an electronic wallet application 13a, a server list 13b, a group joining record 13c, and a point record 13d may be stored.

The electronic wallet application 13a may generate transactions, such as deposit and remittance, for virtual currency in the distributed network system. The electronic wallet application 13a may be a program that runs in a mobile environment, such as Android or iOS, and may run in a known PC OS.

The server list 13b may include information related to the servers that group the nodes of the distributed network system 100. For example, the server list 13b may include a unique ID and server location information (IP, latitude, and longitude) of the point exchange service server 20, the electronic commerce server 30, and the virtual currency exchange server 40.

In FIG. 1, one point exchange service server 20, one electronic commerce server 30, and one virtual currency exchange server 40 are shown and described. However, there may be a plurality of point exchange service servers 20, electronic commerce servers 30, and virtual currency exchange servers 40, and the server list 13b may store therein information on the plurality of point exchange service servers 20, electronic commerce servers 30, and virtual currency exchange servers 40.

The group joining record 13c may store a history of joining a group previously. Herein, the group may be a result of grouping, into a single group, adjacent nodes on the basis of location information of nodes by at least one server communicating over the distributed network. The history of joining the group may be a gateway in the group.

Such grouping may increase the efficiency of communication between neighboring nodes that frequently perform communication.

In the present disclosure, the group joining record 13c may be omitted.

The user computing device 10 for using a blockchain may include a blockchain-only semiconductor chip, or may use a software way including a blockchain encryption key.

In the case of the software way, encryption is possible to prevent wiretapping during a call, and encryption is possible only between the user computing devices 10 that use the blockchain software.

As another example of the user computing device 10 for using a blockchain, a blockchain-only application or a platform application may be used.

In the case of the blockchain-only application or the platform application, the application may have a calling function, a message function, and functions related to document storage, shopping, payment, chat, and coin, so that the functions are used. The application may be distributed through a market, such as an application store.

The point record 13d stores therein information on a point for which a virtual currency is exchanged, which will be described in more detail later.

Figure 3:
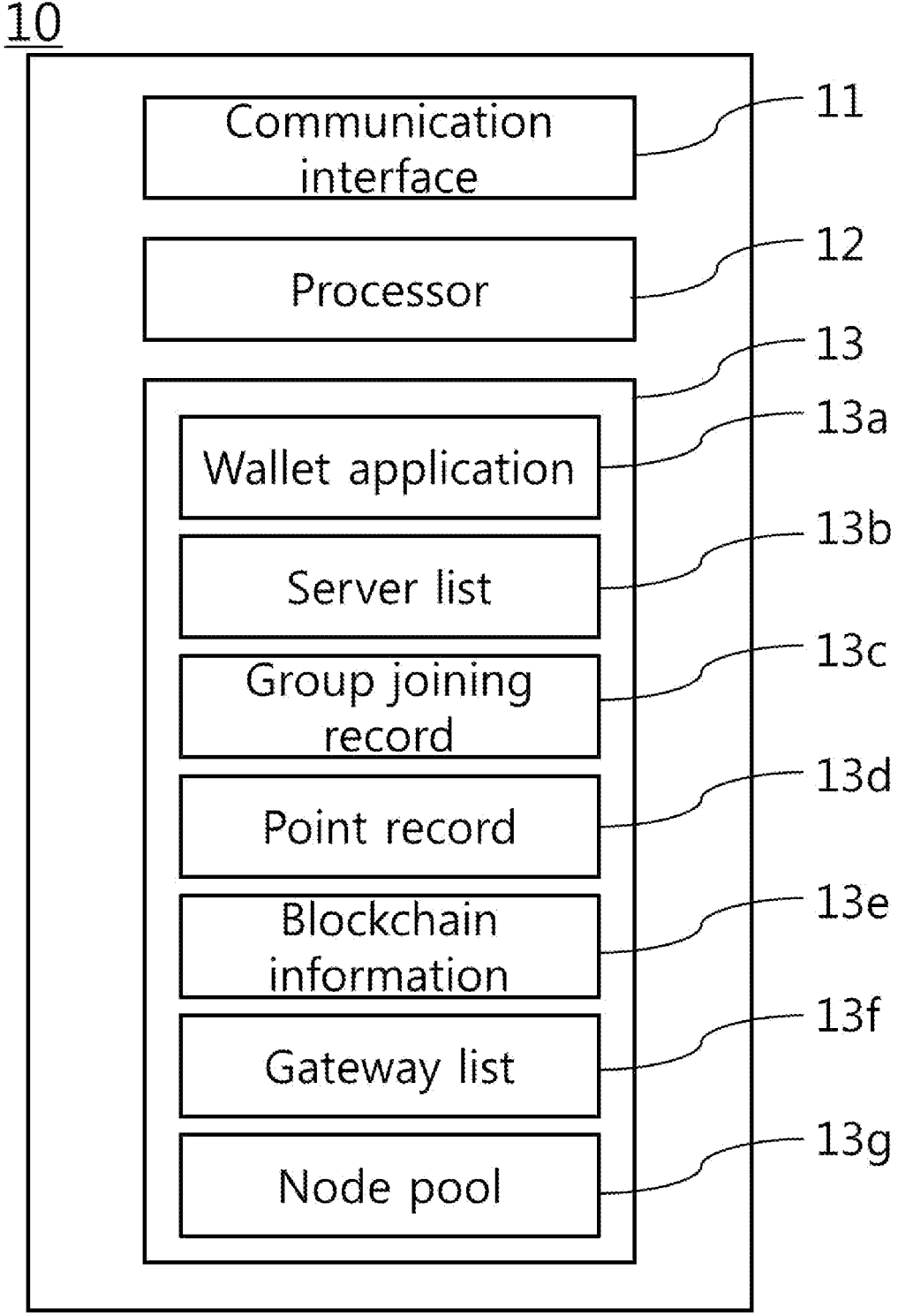

FIG. 3 is a block diagram illustrating another example of a user computing device 10.

In the example shown in FIG. 3, the memory 13 may further include blockchain information 13e, a gateway list 13f, and a node pool 13g.

The example of FIG. 2 shows the case in which the user computing device 10 operates as a light node, and the example of FIG. 3 shows the case in which the user computing device 10 operates as a full node.

Preferably, the user computing device 10 operating as a light node is a mobile device, may be a device that runs on a mobile OS. The user computing device 10 operating as a full node is a PC-based device and may run on a PC OS.

The blockchain information 13e may store transactions generated in the distributed network, and may store transaction-related data in a blockchain structure. That is, the data are stored on a per-block basis, and the stored data are linearly connected to each other.

Each block stores all the data related to the blockchain, and the summary of the data is defined in the header. In the case in which the user computing device 10 operates as a light node, trade may be conducted only using the information in the headers without using all the blocks.

The user computing device 10 operating as a full node may operate as a gateway, and may manage one group. The gateway may generate a block, receive a block reward, and distribute the received block reward to the nodes in the group to which the gateway belongs.

Herein, the nodes include other full nodes and light nodes belonging to the group.

The above-described block may be virtual currency mining.

The gateway list 13f includes information related to the gateways that currently operate as gateways and runs a group. The gateway list 13f may be stored in each of the point exchange service server 20, the electronic commerce server 30, and the virtual currency exchange server 40.

The node pool 13g may include information on other nodes belonging to the group.

The user computing device 10 of the present disclosure may perform virtual currency mining while operating as a node of the blockchain network, and may deal virtual currency through the virtual currency exchange server 40.

The virtual currency mined or dealt as described above is recorded in the electronic wallet of the blockchain network, and information on dealing is recorded in the electronic wallet application 13a.

In addition, as the record of dealing is stored in a distributed manner, the record of dealing may be determined by the point exchange service server 20, the electronic commerce server 30, and the virtual currency exchange server 40 described above.

The point exchange service server 20 is a node of the blockchain network, and exchanges a virtual currency for a point arranged within the blockchain network. Herein, the point is based on the value of each virtual currency. When a request for exchange is received from the user computing device 10, exchange takes place for the point agreed on the basis of a virtual currency value at an exchange time point from the virtual currency exchange server 40.

Herein, the point exchange service server 30 may obtain an exchange fee.

The point exchange service server 30 may group the user computing devices 10 as described above.

Before exchanging the virtual currency of the electronic wallet of the user computing device 10 for a point, the point exchange service server 20 makes a request to a consensus network for agreement. When the agreement is reached, the virtual currency of the electronic wallet of the user computing device 10 is deducted and a point corresponding thereto is provided and recorded in a distributed ledger or a ledger.

The point for which the virtual currency is exchanged may be provided to the user computing device 10 or stored in a database of the point exchange service server 20, and may be stored in the point record 13d of the user computing device 10.

Figure 4:
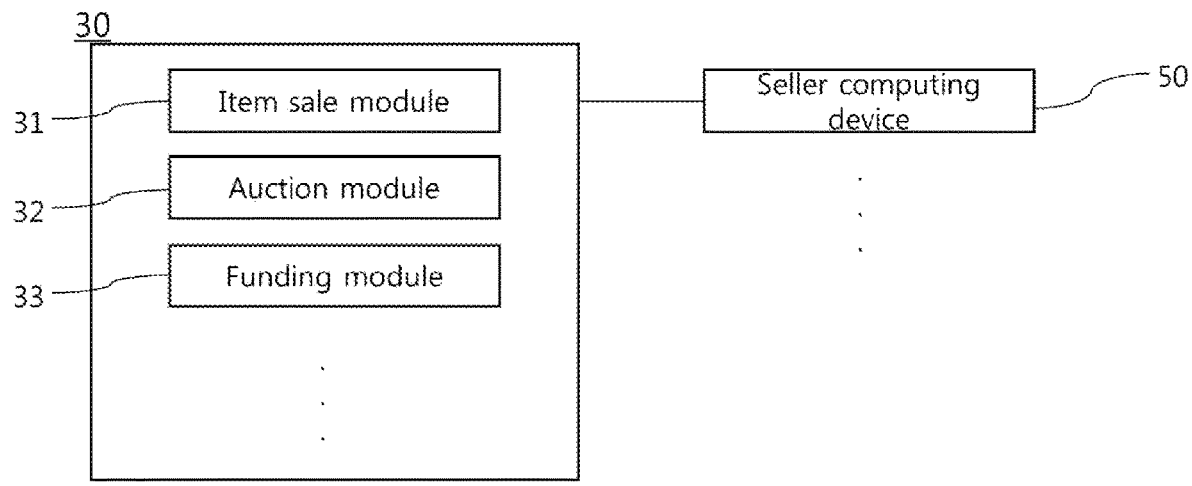
FIG. 4 is a block diagram illustrating an electronic commerce server.

FIG. 4 is a block diagram illustrating the electronic commerce server 30.

Referring to FIG. 4, the electronic commerce server 30 may provide an item sale module 31 that performs relaying between a plurality of seller computing devices 50 and the user computing device 10 so that an item and a service item can be dealt. Herein, the items may include used items.

In addition, the electronic commerce server 30 may include an auction module 32 for conducting an auction of an article provided by a particular seller computing device 50.

The auction module 32 defines at least a start point, an asking-price point, and an auction period.

In addition, the electronic commerce server 30 includes a funding module 33 so that investment can be supported through participation by the user computing devices 10 for an idea provided from a particular seller computing device 50.

The funding module 33 makes investment from the user computing devices 10 in an idea for a cultural content item of a particular user computing device 10, wherein examples of the cultural content items include an item (product) idea service item, a movie, music, a novel, a poem, and a video.

The electronic commerce server 30 provides a public creation platform.

Figure 5:
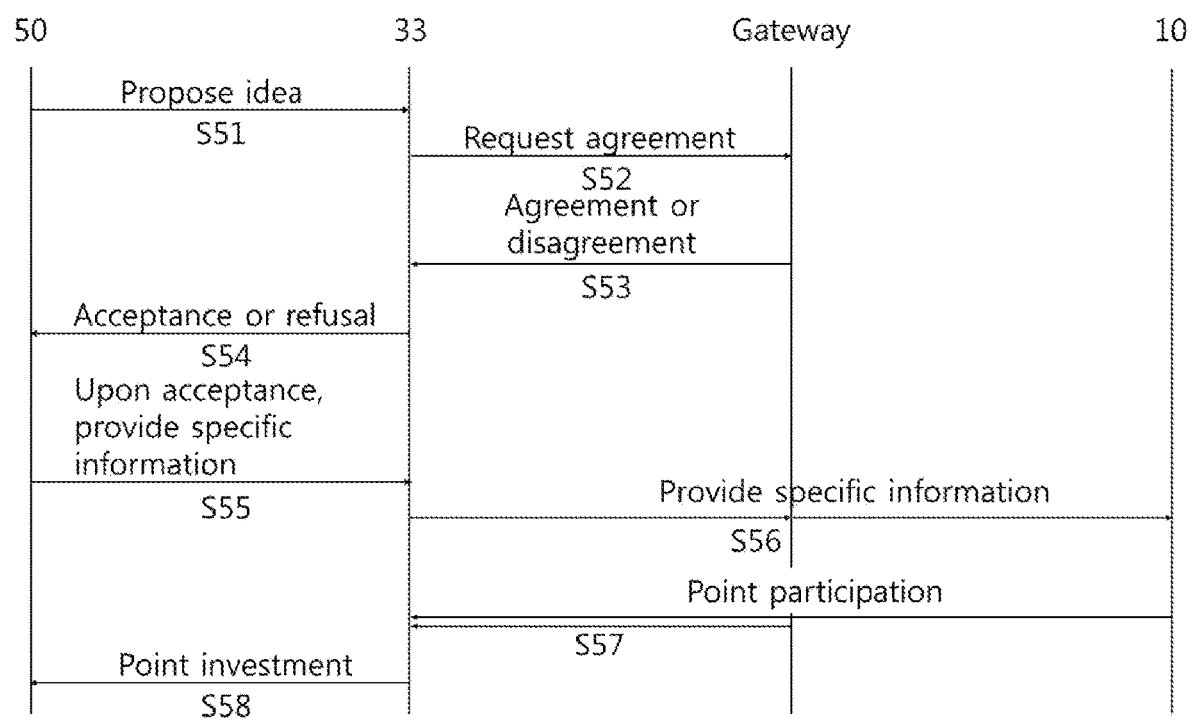
FIG. 5 is a diagram illustrating a process of a funding module.

FIG. 5 shows a process of the funding module 33.

First, as step S51, a seller computing device 50 writes an idea to be funded and provides the same to the funding module 33 of the electronic commerce server 30.

As described above, examples of the idea may include ideas of actual items and service items, and cultural content items, such as movies, games, music, etc. Any idea with an investment value may be provided regardless of its classification.

To verify the investment value of the idea, the funding module provides a funding agreement request to a gateway among grouped user computing devices 10 at step S52. Herein, the funding agreement request is transmitted only to the gateway user computing device 10, namely, a representative of the group and is not transmitted to the other user computing devices 10 belonging to the group.

This is to reduce the complexity of the funding process as well as shorten the time.

The gateway checks the idea proposed by the seller computing device 50 according to the funding agreement request provided at step S52, and may make an expression of intention of agreeing on the funding or not.

The funding module 33 collects gateways' intentions of agreement or disagreement. A funding proposal acceptance intention is transmitted when a set reference (for example, majority) is exceeded or an intention of refusal is transmitted when the set reference is not reached at step S54.

With the funding proposal accepted, the seller computing device 50 provides funding instructions resulting from refining and specifying the idea, to the funding module 33 at step S55.

Next, at step S56, the funding module 33 provides the funding instructions to all the user computing devices 10 in the group including the gateway.

Herein, the funding instructions may be transmitted from the funding module 33 to all the user computing devices 10. Alternatively, with the funding instructions posted on the web or cloud, only the link is transmitted to the user computing devices 10.

Next, the user of the user computing device 10 who has received the funding instructions may make investment in the funding.

Herein, the investment may not be the investment using virtual currency itself, but the investment using the point for which the virtual currency is exchanged through the point exchange service server 20, as described above.

The user computing device 10 provides an investment intention and an investment point to the funding module 33. The funding module 33 deducts the point from the electronic wallet of the user computing device 10 directly or via the point exchange service server 20, and provides the point to the seller computing device 50.

Herein, the funding module 33 may obtain a point as a fee.

As described above, according to the present disclosure, user computing devices 10 are grouped into a plurality of groups, and the intentions of gateways that are representatives of the groups are applied in determining whether to provide funding, whereby the time and cost required to manually determine the possibility of funding can be reduced and the possibility of success of the funded item or service can be determined from the investor base.

Afterward, when the funding is successful and the physical item, service item, or cultural content is successfully launched, the seller computing device 50 requests the electronic commerce server 30 to sell the item and sells the item funded by the above-described point sale method.

Herein, the user computing device 10 that has invested in the funding may receive a point as a reward according to an investment point proportion of the sales of the item.

Accordingly, the electronic commerce server 30 enables a physical item or a service item to be purchased with a point and may conduct auction and investment with a point.

The electronic commerce server 30 uses a point of the value for which virtual currency is exchanged, rather than cash or virtual currency, so that a variety of electronic commerce can be achieved regardless of a type of virtual currency held in the electronic wallet of the user computing device 10.

The virtual currency exchange server 40 may provide a service for exchanging a point for a virtual currency.

In the present disclosure, the example of using a point to participate in physical item dealing, service item dealing, auction, and funding has been described above.

In addition to this, the present disclosure may provide a service for recommending talents and connecting companies and job seekers through talent recommendation requests. In this process, history information of the job seekers is stored in the electronic commerce server 30, and the companies may find suitable job seekers for employment.

Hereinafter, a more specific example of the virtual currency mining and point conversion process using the user computing device 10 will be described.

Figure 6:
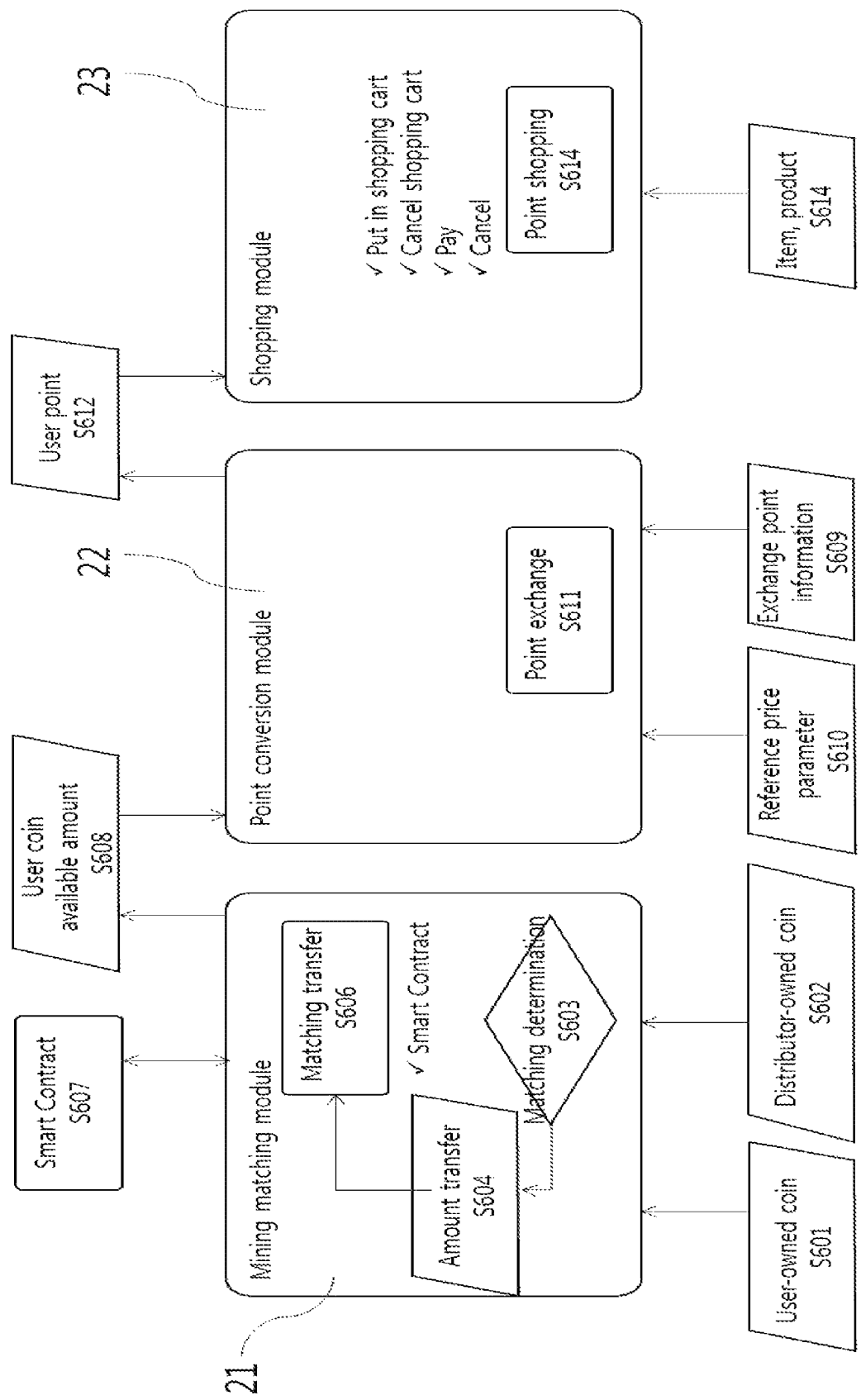
FIG. 6 is a diagram illustrating a function module structure of a point exchange service server.

FIG. 6 is a diagram illustrating a function module structure of the point exchange service server 20.

Referring to FIG. 6, the point exchange service server 20 may functionally include a mining matching module 21, a point conversion module 22, and a shopping module 23. The mining matching module 21, the point conversion module 22, and the shopping module 23 of the point exchange service server 20 may be understood as results of functional division of the process performed by a processor of the point exchange service server 20.

In addition, it is also possible that the point exchange service server 20 includes the mining matching module 21, the point conversion module 22, and the shopping module 23 as hardware components resulting from dividing the processor for respective processing operations.

The mining matching module 21 is a function module that enables the virtual currency mined by the user computing device 10 to be converted into a point. The point conversion module 22 is a module that determines the value of the virtual currency which the user computing device wants to exchange, and exchanges the virtual currency for a point according to the value. The shopping module 23 is a module that purchases, instead, an item with a point, in the electronic commerce server 30.

First, at step S601, the mining matching module 21 determines the amount of virtual currency held in the electronic wallet of the user computing device 10.

In addition, the amount of virtual currency of the distributor who distributes the virtual currency is determined at step S602.

As described above, the user computing device 10 has the authority to mine. In particular, a full node user computing device 10 performs mining. The grouped user computing devices 10 may perform division of a role for the mining process.

In particular, the gateway user computing device 10 is the subject of the mining process, and the group of the user computing devices 10 constitute one mining pool.

Therefore, the mined virtual currency is distributed to the user computing devices 10 in the group participating in the mining. Herein, the gateway user computing device 10, namely, the mining subject, is a distributor.

That is, the mining matching module 21 may determine the currently held virtual currency of the user computing device 10, considering both the virtual currency held by the user computing device 10 desired to be exchanged for a point and the virtual currency to be distributed by the gateway, namely, the distributor.

In the above example, when the user computing device 10 that wants an exchange for points is different from the gateway, the user computing device 10 receives a share of the mined virtual currency and its held virtual currency increases accordingly.

However, when the user computing device 10 that wants the exchange for points is the same as the gateway, the mined virtual currency needs to be distributed to the other user computing devices in the group, so according to the proportion, the held virtual currency decreases.

That is, as step S603, the virtual currency to be transferred from the distributor to the user computing device 10 that wants the exchange for points is calculated from the coins of the distributor according to factors of the time and distribution proportion.

At step S604, the virtual currency to be transferred is fixed. At step S606, the virtual currency to be transferred is added to the electronic wallet of the user computing device 10 that wants the exchange for points.

Herein, step S606 is based on the conclusion of a contract through a smart contract (step S607).

The smart contract enters a condition to a block, and enables set matters to be automatically implemented when the condition is satisfied. In particular, the smart contract specifies the conditions related to the change of the held virtual currency on the blockchain network, and enables the virtual currency of the distributor to be automatically transferred to the electronic wallet of the user computing device 10 when the conditions are satisfied.

Next, at step S608, the point conversion module 22 receives information on the virtual currency amount that the user computing device 10 holds which is determined by the mining matching module 21. At step S609, the virtual currency amount desired to be exchanged for a point or the point is input to the point conversion module 22.

Next, at step S610, the point conversion module 22 requests the virtual currency exchange server 40 so as to receive a reference price parameter of the virtual currency to be exchanged for a point exchange.

As described in detail above, the value of virtual currency changes with respect to currency, the definite value at a point exchange time point is determined, and exchange for the point corresponding thereto takes place.

At step S611, the virtual currency amount requested by the user computing device 10 is exchanged for a point according to the reference price parameter.

Next, the shopping module 23 may be omitted when necessary. In the case in which the shopping module 23 is omitted, the point is provided to the electronic wallet of the user computing device 10, and the user computing device 10 may use the point in purchasing an item or service of the electronic commerce server 30 or in participating in auction or funding.

The shopping module 23 is for making a purchase instead. At step S612, the shopping module 23 determines the point of the user computing device 10 for which exchange has been performed by the point conversion module 22. The shopping module 23 purchases the item of the electronic commerce server 30 with the point and receives the purchased item at step S614.

At step S614, when the item is a physical item, the physical item is delivered to the address specified by the user computing device 10. When the item is a digital item, the digital item is directly transmitted to the user computing device 10.

According to the present disclosure, virtual currency is not directly used for dealing, but is exchanged for a point of the corresponding value, and a point is used in purchase of an item or service, auction, or funding investment, whereby the generality of virtual currency can be enhanced and virtual currencies can be used according to the same value reference regardless of their types.

In addition, the electronic commerce server 30 may provide a service that enables people (user computing devices) to participate in a sale of artworks, or trade in artworks for asset diversification, and to share the artworks.

The consigned works are rental, license-use, and collaboration products, and may be enabled to make profits through production and distribution, and the profits may be shared among the co-owners.

The profit rate data may be an objective criterion for artwork value evaluation.

Registered antiques, pictures, videos, and artworks are processed into NFTs and the digital ownerships thereof are secured by a blockchain technology.

In addition, the users of the user computing devices 10 may become co-owners through NFT division trade. The physical artwork may be consigned to the asset exchange for storage and management so that digital ownerships and physical ownerships are held.

The embodiments of the present disclosure have been described for illustrative purpose, and those skilled in the art will easily understand that the present disclosure may be modified in various ways and tther equivalent embodiments are possible. Accordingly, the scope of the disclosure should be determined by the accompanying claims.

The invention claimed is:

1. A system, comprising:
a user computing device holding a virtual currency, as a node of a blockchain network;
a virtual currency exchange server including circuitry configured to support virtual currency trading;
a point exchange service server including circuitry configured to
determine a reference price parameter from the virtual currency exchange server when there is a request for exchange of the virtual currency that the user computing device holds,
determine an amount of virtual currency held in an electronic wallet of the user computing device, and
exchange the virtual currency for a point corresponding to the virtual currency requested to be exchanged; and
an electronic commerce server configured to provide support for purchase of an item with the point,
wherein each user computer device, of a plurality of the user computing devices, is one of a full node or a light node of the blockchain network, and are configured to mine the virtual currency in a group or individually, the user computing device and other user computing devices constituting a mining pool, one of the full nodes in the group, formed by grouping adjacent nodes based on location information of the nodes, operates as a gateway configured to generate a block in a blockchain on the blockchain network, receive a block reward, and distribute the received block reward to the nodes in the group to which the gateway belongs,
wherein a gateway list including information related to the one full node operating as the gateway is stored in the point exchange service server,
wherein the point exchange service server is further configured to
determine whether the user computing device is different from the gateway based on whether the user computing device is included in the gateway list and switch between increasing and decreasing the amount of virtual currency held in the electronic wallet based on a result of the determination of whether the user computing device is different from the gateway,
wherein the full node is a personal computing-based device running on a personal computing operating system and the light node is a mobile device that runs a mobile operating system,
wherein the user computing device receives a share of virtual currency mined by the user computing device and the amount of virtual currency held in the electronic wallet increases by the received share of the mined virtual currency, based on the determination that the user computing device is different from the gateway, and
wherein the mined virtual currency is distributed to other user computing devices in the group and the held virtual currency decreases in proportion to the distributed mined virtual currency, based on the determination that the user computing device is same as the gateway.

2. The system of claim 1, wherein the point exchange service server comprises:
a mining matching module configured to determine whether the virtual currency to be exchanged is held, according to the request of the user computing device for exchange; and
a point conversion module configured to exchange the virtual currency for the point according to the reference price parameter when the mining matching module determines that the virtual currency to be exchanged is held,
wherein the mining matching module and the point conversion module are each implemented via at least one processor.

3. The system of claim 2, wherein the point exchange service server further comprises the electronic commerce server for the user computing device of which the virtual currency is exchanged for the point.

4. The system of claim 2, wherein the item is at least one item selected from a group of a physical item, a service item, an auction, employment, and cultural content.

5. A method, comprising:
- a) determining, by a point exchange service server, an amount of virtual currency that a user computing device holds in an electronic wallet as a node of a blockchain network when the user computing device makes a request for exchange of the virtual currency that the user computing device holds;
- b) exchanging, by using a reference price parameter determined by the point exchange service server, the virtual currency for a point corresponding to an amount of the virtual currency requested to be exchanged when the amount of the virtual currency requested to be exchanged is equal to or smaller than an amount of the virtual currency that the user computing device holds, as a result of determination at the step a);
- c) purchasing an item provided by an electronic commerce server, by using the point,
wherein each user computer device, of a plurality of the user computing devices, is one of a full node or a light node of the blockchain network;
- d) mining, by the plurality of user computing devices, the virtual currency in a group or individually, the user computing device and other user computing devices constituting a mining pool, one of the full nodes in the group, formed by grouping adjacent nodes based on location information of the nodes, operates as a gateway configured to generate a block in a blockchain on the blockchain network, receive a block reward, and distribute the received block reward to the nodes in the group to which the gateway belongs,
wherein a gateway list including information related to the one full node operating as the gateway is stored in the point exchange service server;
- e) determining, by the point exchange service server, whether or not the user computing device is different from the gateway based on whether the user computing device is included in the gateway list; and
- f) switching, by the point exchange service server, between increasing and decreasing the amount of virtual currency held in the electronic wallet based on a result of the determination of whether the user computing device is different from the gateway,
wherein the full node is a personal computing-based device running on a personal computing operating system and the light node is a mobile device that runs a mobile operating system,
wherein the user computing device receives a share of virtual currency mined by the user computing device and an amount of virtual currency held in an electronic wallet by the user computing device increases by the received share of the mined virtual currency, based on the determination that the user computing device is different from the gateway, and
wherein the mined virtual currency is distributed to other user computing devices in the group and the held virtual currency decreases in proportion to the distributed mined virtual currency, based on the determination that the user computing device is same as the gateway.

6. The method of claim 5, wherein at the step b), the reference price parameter is provided by a virtual currency exchange server, and determines values of respective virtual currencies at a point exchange time point according to types of the virtual currencies.

7. The method of claim 5, wherein at the step a), the user computing device belongs to the group including the gateway that is a full node.

8. The method of claim 6, wherein the item is at least one item selected from a group of a physical item, a service item, an auction, funding, employment, and cultural content.

9. The method of claim 8, wherein the funding is funding for content items and creation thereof on a public creation platform, the content items including at least one selected from a group of a physical item idea, a service item, a movie, game, music, a novel, a poem, and a video.

10. The method of claim 8, wherein the user computing device is a smartphone,
- in which installed is a blockchain-only application or a platform application distributed through an application store and including call, message, document storage, chat, shopping, payment, and virtual currency functions, or
- in which a blockchain-only semiconductor chip is included and a blockchain encryption key is used so that privacy and security functions are enhanced.

11. The method of claim 8, wherein the electronic commerce server is configured to enable an artwork registered in an asset exchange to be jointly owned as the artwork is processed into an NFT and digital ownerships are secured by a blockchain technology, and share a profit obtained through rental, license use, and collaboration among the user computing devices, and data of a result of profit rate share is an objective criterion for artwork value evaluation, and
the artwork is consigned to the asset exchange for storage and management so that the digital ownerships and physical ownerships are held.

12. The system of claim 3, wherein the item is at least one item selected from a group of a physical item, a service item, an auction, employment, and cultural content.

13. The system of claim 1, wherein each block in the blockchain stores all data related to the blockchain and a summary of the data is defined in a header of the block,
a trade is conducted using only information in the headers without using all the blocks, based on the user computing device being the light node, and
a trade is conducted using the blocks, based on the user computing device being the full node.

* * * * *